No. 681,434. Patented Aug. 27, 1901.
T. B. BAYLESS.
FRUIT CAR.
(Application filed June 1, 1901.)
(No Model.) 2 Sheets—Sheet 2.
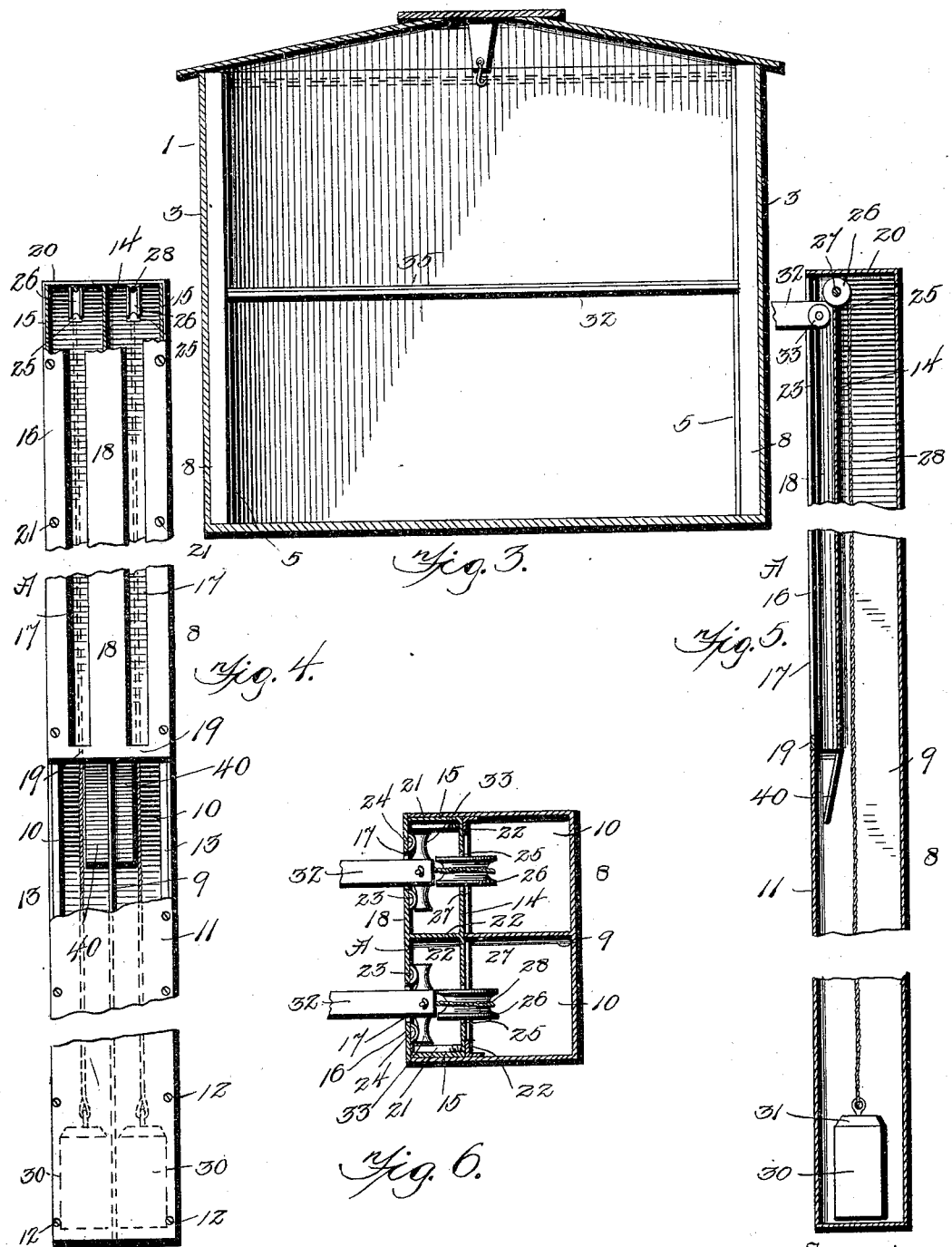
Witnesses Inventor
Thomas B. Bayless
by
His Attorney

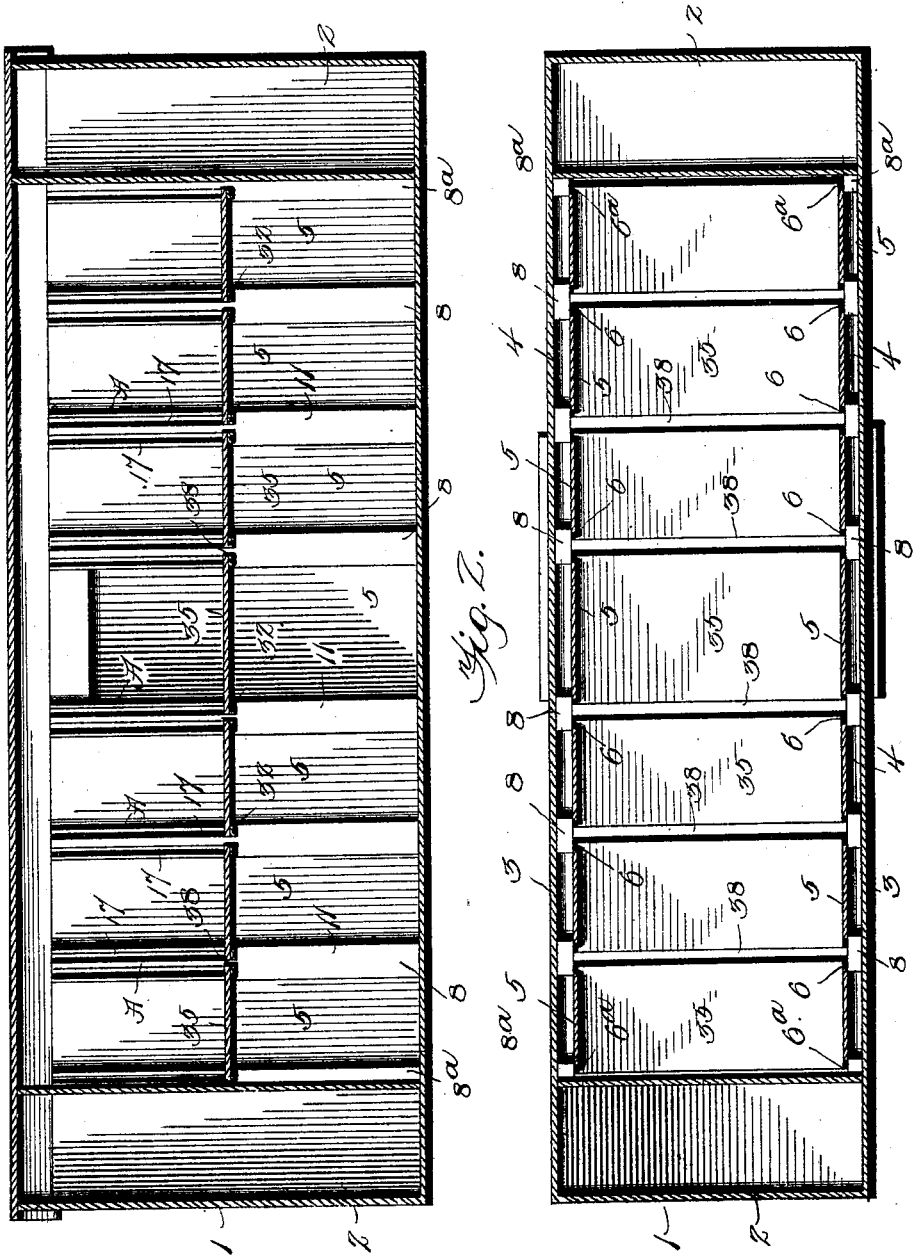

UNITED STATES PATENT OFFICE.

THOMAS BURNS BAYLESS, OF LEXINGTON, KENTUCKY.

FRUIT-CAR.

SPECIFICATION forming part of Letters Patent No. 681,434, dated August 27, 1901.

Application filed June 1, 1901. Serial No. 62,777. (No model.)

*To all whom it may concern:*

Be it known that I, THOMAS BURNS BAYLESS, a citizen of the United States, residing at Lexington, in the county of Fayette and State of Kentucky, have invented certain new and useful Improvements in Fruit-Cars; and I do hereby declare the following to be a full, clear, and exact description of the invention, such as will enable others skilled in the art to which it appertains to make and use the same.

This invention relates to freight-cars; and it consists, substantially, in the improvements hereinafter more particularly described, and pointed out in the claims.

The invention has reference more particularly to cars for the shipment or transportation of bananas and other perishable freight in bulk; and it has for its principal object to provide means for preserving or preventing the fruit or other freight from decay while in transit.

Other objects will also more fully hereinafter appear when taken in connection with the accompanying drawings, in which—

Figure 1 is a longitudinal sectional view of a freight-car embodying my improvements, and Fig. 2 is a sectional plan view thereof to more clearly indicate the arrangement or disposition of the supplementary flooring for the freight. Fig. 3 is a transverse sectional view taken in front of opposite supporting posts or stanchions for the movable trays or sections forming the supplementary flooring. Fig. 4 is an enlarged view in detail to more clearly indicate the construction of the hollow post or stanchion, and Fig. 5 is also a detail view. Fig. 6 is a broken and enlarged sectional view of one of the posts or stanchions.

In the consignment of bananas and other fruit to distant points in bulk it is the practice in some instances to put the same up in the cars therefor while still green or unripe; but for short distances the fruit is sometimes shipped even after it has fully ripened. In the one case precaution is necessary to prevent the too-rapid ripening of the fruit in transit and in the other to retard as much as possible the natural decomposition thereof. It frequently happens, however, that the bananas or other fruit rapidly decays and the cargoes become a dead loss to the owners in many instances. This is due principally to the bad ventilation of many of the cars or vehicles in which shipments are made, as well as the ineffective air circulation of said cars, which results in undue heating of the fruit in transit. By my invention these objections are entirely overcome and the most perfect distribution or circulation of air provided through and around the banana-bunches or other fruit while located in the car.

In carrying my invention into effect I provide in the car what I term a "supplementary flooring" for the support of the bananas or other fruit, said supplementary flooring being of dimensions substantially equaling the interior dimensions of the car between the side and end walls thereof and comprising any suitable number of vertically-movable independent trays or sections, which are of any preferred construction and material. A suitable number of such movable trays or sections is employed on either side of the door at the side of the car, and a similar tray or section is also employed at a point coincident with the door or its opening, so that the operator can have easy and ready access to the car in the loading and unloading thereof. Said movable trays or sections each work in suitable guides therefor, and normally they are engaged or held in an elevated position in the car, adjacent the roof or top thereof, preferably by means of suitable catches or their equivalent provided for the purpose. The trays or sections are each also provided with counterbalancing devices for sustaining the weight of the bananas or other fruit thereon, and preferably the downward movement of the said trays or sections is limited to about one-half the height of the car, so as to provide sufficient space beneath for packing or storing other freight or for any other desired purpose, said arrangement also providing for the free passage of air between the ice boxes or receptacles located at each end of the car. Passages or spaces are formed between the said trays or sections, so that a most adequate and thorough circulation of air is had through and about the fruit or other freight in transit, and it will be seen from the following description that my invention is most effective for its intended purposes.

Specific reference now being had to the annexed drawings, 1 represents an ordinary freight-car for fruit or vegetables, preferably of the refrigerator type and having an ice box or receptacle 2 at each end thereof, together with peculiarly-constructed inner walls, to be described, and outer walls 3, the two said walls having a suitable cold-air space 4 between them. The said inner walls are each preferably made up of corresponding independent sections 5, which are separated from each other for practically their full height, so as to provide spaces 6 between the same at predetermined points of the inner sides of the car. One of said division-spaces 6 is located on each side of the car, directly adjacent to or in line with either side of the door thereof, as shown in Fig. 2, while beyond each of these spaces two successive similar spaces are employed, together with a third or endmost space, (marked 6ª,) which latter spaces separate the endmost inner-wall sections from the ice boxes or receptacles at the ends of the car. The said endmost spaces 6ª are narrower than the spaces 6, for the purpose appearing more fully hereinafter. The particular number of spaces herein shown is simply and preferably to limit the number of trays or sections employed for the supplementary flooring hereinafter referred to; but it is clearly apparent that I am not restricted thereto in the practice of my invention. Located in each of the said spaces 6 is a hollow post or stanchion 8, of metal or other suitable material, said posts being preferably of depth equaling the distance between the inner and outer car-walls, of height substantially equaling the height of the car within, and of width to completely fill up or close the said spaces. Said posts or stanchions are box-like in form and are each formed or provided with a partition 9, dividing the same into two vertical compartments 10, and each post is also closed for its lower half by means of a removable cover or plate 11, secured in place by means of screws 12, which enter holes or openings provided therefor in suitable flanges or strips 13, located on the inner sides of the post and either integral therewith or detachable therefrom. For its upper half each of said posts or stanchions is constructed or provided with, preferably, a removable frame A, comprising a back piece or plate 14, side pieces 15 15, and a front plate 16, formed or provided with two vertical slots or openings 17 17, separated or divided by the central strip 18. Said slots or openings are closed at their lower extremities or bases, as shown at 19, while the upper ends or extremities thereof may be closed by the top or cap piece 20 of the said post or stanchion, as shown. This removable frame fits between the sides of the post and is secured in place by means of screws 21, passing therethrough and entering openings therefor in flanges or strips 22 interiorly of the post and integral therewith or separable therefrom, as desired. The central strip 18 of the front plate 16 of the said removable frame of each post or stanchion 8 is secured to a web or flange 22, which in turn is secured in any suitable manner to the inner side of the back piece or plate 14 of said frame, and on the inner side or surface of said strip 18 suitable rails 23 are formed or provided, one being on either side of said web or flange 22 at or near the edge of the strip, similar rails 24 being formed or provided on the inner side of the said front plate 16, at or near the outermost edges of the slots or openings 17 17 therein. Fitting in each of the endmost spaces 6ª of the inner walls of the car is a similar hollow post or stanchion 8ª of only about one-half the width of said posts 8, but of equal depth and height with the latter. Said posts or stanchions 8ª are constructed substantially the same as the posts or stanchions 8, except that they each comprise but a single compartment 10, while the front plates 16 of the removable frames A thereof are formed with but a single slot or opening 17, as shown, and formed or provided on the inner surfaces of said front plates, at or near the edges of said slots or openings, are also rails, which are not shown. The purpose of this slight difference or variation in the construction of the said hollow posts or stanchions 8 and 8ª will be more fully understood hereinafter.

It will be observed that in virtue of the space consumed or occupied by the removable frames A in the upper portions of the posts 8 and 8ª the depth of the compartments 10 of said posts is rendered less for the said upper portions of the latter than for the lower portions thereof. It will also be observed that the back plate 14 of each of said frames A is formed at its upper edge with notches 25, which are in line with the slots or openings in the front plate, while turning or working in each of said notches is a guide pulley or sheave 26, mounted on a suitable rod or shaft 27, secured to the outer side of the back plate across the said notch or notches 25. Passing over each of said guide-pulleys 26 is a cord, rope, or chain 28, to the inner end of which is secured or attached a counterbalance or weight 30, moving or working up and down in the post-compartment 10 belonging thereto, said counterbalances or weights in the present instance being each preferably beveled or tapered at 31, as shown, although it is evident, of course, that I am not limited to this particular construction. The other ends of corresponding cords, ropes, or chains 28 are fastened to the opposite ends of a cross-piece 32, reaching from side to side of the car and the ends of which move between and are guided laterally by the edges of the slots or openings 17 in the front plates 16 of opposite posts or stanchions. Each end of each of the said cross-pieces 32 is provided at the sides thereof with grooved wheels 33, which travel upon the pairs of rails on the inner sides of the said front plates, as shown, and it will be observed that each successive pair (beginning at either end of the car) of said cross-pieces 32, combined with a board or plate 35, secured thereto, constitute a vertically-movable tray or section for the support of bananas or other fruit, said trays or sections when taken collectively or as a whole constituting what I have herein termed a "supplementary flooring" for the car, capable of being raised and lowered preferably, though not essentially, within the limits prescribed by the construction herein shown. It is evident that instead of the board or plate 35 herein shown this part or element of each of said trays or sections may be constructed of open or reticulated material, if desired, and it will also be understood that each of said cross-pieces 32 may, if desired, be constructed of two or more pieces jointed or otherwise secured together. As thus disposed or arranged suitable spaces 38 are formed between the several movable trays or sections and which provide for the free circulation or distribution of air through and about the fruit-bunches at the time the trays are all brought to substantially the same horizontal position by the weight of the fruit thereon. Said spaces also enable the insertion of the hands and arms of the operator between trays for the purpose of manipulating the latter at or during the time the cargo is being loaded or unloaded.

In Fig. 3 the trays or sections of the supplementary flooring are shown in their lowermost positions in full lines, while the raised or elevated position thereof is indicated by the dotted lines of said figure. It is evident, of course, that when no fruit or other weight is upon the trays or sections the weights or counterbalances 30 themselves serve to hold said trays in their elevated positions, provided, of course, the cords or ropes 28 are of proper length to prevent said weights resting upon the bottom of compartments 10 when in their lowermost positions. Preferably, however, as an additional security for this purpose I provide at the top of the car a suitable catch for each tray, which engages a pin or other device on the latter, as shown. To prevent any impediment or obstruction to the proper raising or elevation of the weights which might sometimes be occasioned by contact of the latter with the lower ends of the removable frames A of the posts or stanchions, I form or provide an inclined plate or deflector 40 on each side of each of the partitions 9 immediately at or slightly below the lower end of said frames, and when the trays are lowered and the weights or counterbalances thereby raised or elevated to such points the said inclined plates serve to deflect the said weights outwardly in such manner as to cause them to continue to move upwardly behind the said removable frames for the distance necessary to bring the trays to their lowermost positions. The beveled form of the upper parts of said weights or counterbalances facilitate the deflection of the latter in that they are thus enabled to glance past the inclined plates or deflectors 40 the more readily.

From the foregoing it will be understood that my invention is equally adapted to new cars as well as to many forms of freight or refrigerator cars already in use, and in the latter case can be put up or constructed without damage to or material alteration of the car. It will also be seen from the arrangement or disposition of the parts shown that to load the trays operator has simply to enter the car at the side and then begin at one end thereof and continue from that end successively until the door-opening is reached, whereupon he begins at the other end in the same way and loads each tray successively until the door-opening is again reached, and finally the middle tray at the door is likewise loaded after stepping on the outside of the car to enable said tray to be lowered. To unload the trays of the cargo, the operation is simply the reverse of that just described. When the trays or sections of the supplementary flooring are all raised or elevated, it is evident that but little of the interior of the car is taken up by any of the operative parts or elements of my invention, and hence the car can then be used for any other desired purpose. Likewise, even when the trays are all loaded and lowered to their full limit, the remaining space between the trays can be utilized for other kinds of freight or for any other purpose.

As to the construction of the several elements or parts of my invention, it will be understood that I do not limit myself thereto in any of the details herein shown and described, since immaterial changes can be made from the present embodiment and still be within the scope of the invention. Any suitable material may be used in the construction, and it should be added that the cost thereof is comparatively small as compared with other constructions heretofore devised for a similar purpose.

It will be observed from the drawings, Fig. 5, that the lower ends of the inclined plates or deflectors 40 of each post or stanchion terminate short of or some distance from the inner side of the removable cover or plate 11, thus forming a space between the two sufficient for the passage to the lower interior of the post of any dirt or rubbish that may find its way through the slots or openings 17. The said cover or plate 11 can be detached whenever desired without interfering with the frame A at the upper part of the post, so as to enable the dirt collecting in the post to be removed. The sides and ends of each post or stanchion are preferably made air-tight with respect to the air-space between the inner and outer walls of the car, so as not to interfere with or destroy the refrigeration of the car or its contents.

Having thus fully described my invention, what I claim as new, and desire to secure by Letters Patent of the United States, is—

1. A fruit-car having a supplementary flooring supported in a permanent horizontal position between the sides of the car and provided with means for raising and lowering the same, substantially as described.

2. A fruit-car having a supplementary flooring supported in a permanent horizontal position between the sides of the car and adapted to be raised and lowered, and counterbalances therefor, substantially as described.

3. A fruit-car having a supplementary flooring supported in a permanent horizontal position between the sides of the car and provided with means for raising and lowering the same, said flooring comprising independent sections having spaces between them for the passage of air, substantially as described.

4. A fruit-car having a supplementary flooring comprising separate sections each supported in a permanent horizontal position between the sides of the car and provided with means for raising and lowering the same independently, substantially as described.

5. A fruit-car having a supplementary flooring comprising separate sections each supported in a permanent horizontal position between the sides of the car and adapted to be raised and lowered independently, each section being provided with a counterbalance, substantially as described.

6. A fruit-car having a supplementary flooring comprising separate sections having air-passages between them, each section being supported in a permanent horizontal position between the sides of the car, and also each having a counterbalance and adapted to be raised and lowered independently, substantially as described.

7. A fruit-car having a supplementary flooring comprising separate sections each supported in a permanent horizontal position between the sides of the car and provided with means for raising and lowering the same independently, and means for retaining or holding each section in an elevated position at the upper part of the car, substantially as described.

8. A fruit-car having a supplementary flooring comprising separate sections each supported in a permanent horizontal position between the sides of the car and adapted to be raised and lowered independently, each section having a counterbalance, and means for limiting the downward movement of each of said sections, substantially as described.

9. A fruit-car provided interiorly on opposite sides at predetermined points with hollow posts or stanchions, separate trays or sections adapted to be raised and lowered independently between said posts or stanchions, and counterbalances working in the latter, substantially as described.

10. A fruit-car provided interiorly on opposite sides at predetermined points with hollow posts or stanchions each comprising two independent vertical compartments, separate trays or sections supported by and adapted to be raised and lowered between corresponding pairs of said posts or stanchions, and a counterbalance for the said trays or sections working in each of said compartments, substantially as described.

11. A fruit-car provided interiorly on opposite sides at predetermined points with hollow posts or stanchions having slots or openings in their inner sides for a suitable distance from the upper ends thereof, and each comprising two independent vertical compartments, separate trays or sections adapted to be independently raised and lowered in the slots of opposite pairs of said posts or stanchions, and a counterbalance for the said trays or sections working in each of said compartments, substantially as described.

12. A fruit-car provided interiorly on opposite sides at predetermined points with hollow posts or stanchions having slots or openings in their inner sides for a suitable distance from the upper ends thereof, and each comprising independent vertical compartments, rails alongside the vertical edges of said slots or openings, separate trays or sections working in and adapted to be raised and lowered in the slots of opposite pairs of said posts or stanchions, said trays having wheels moving upon said rails, and a counterbalance for the trays working in each of said compartments, substantially as described.

13. A fruit-car provided interiorly on opposite sides at predetermined points with hollow posts or stanchions each closed within for a suitable distance from its lower end by a removable plate, and each also having a central vertical partition dividing it into two separate compartments, a removable frame fitting each post within for the portion thereof above the plate, said frames comprising back plates, together with front plates connected thereto and formed with vertical slots or openings, guide-pulleys mounted at the upper ends of each of said back plates, rails on the inner sides of the front plates alongside the edges of said slots or openings, separate trays or sections working in and adapted to be raised and lowered in the slots or openings of opposite pairs of said front plates, said trays having wheels moving upon said rails, and cords or ropes attached at one end to the trays and provided at their other ends with counterbalances working in the said compartments, substantially as described.

14. A fruit-car provided interiorly on opposite sides at predetermined points with hollow posts or stanchions comprising the frames A formed with the vertical slots or openings, each post or stanchion also having a vertical central partition dividing the same into two compartments, separate trays or sections adapted to be raised and lowered in the slots or openings of opposite pairs of said frames, weights or counterbalances for each tray or section working in said compartments, and deflecting devices for said weights arranged on opposite sides of said partitions just beneath the lower end of each of said frames, substantially as described.

15. A fruit-car having outer walls, inner walls separated therefrom by a suitable space and comprising independent sections separated from each other for their full height, hollow posts or stanchions of depth equaling the space between the outer and inner walls, and of width and height filling the spaces between said independent sections of said inner walls, said posts or stanchions each having slots or openings in their inner sides for a suitable distance from the upper end thereof, and each also comprising two independent vertical compartments, separate trays or sections adapted to be independently raised and lowered in the slots or openings of opposite pairs of posts or stanchions, and counterbalances for the trays or sections working in said compartments, substantially as described.

In testimony whereof I affix my signature in presence of two witnesses.

THOMAS BURNS BAYLESS.

Witnesses:
E. H. ALEXANDER,
C. W. WEST.